(12) United States Patent
Poteet et al.

(10) Patent No.: US 10,399,908 B2
(45) Date of Patent: Sep. 3, 2019

(54) OXIDATION PROTECTION FOR CARBON-CARBON COMPOSITES

(71) Applicant: Goodrich Corporation, Charlotte, NC (US)

(72) Inventors: Steven Poteet, Hamden, CT (US); John Linck, Pueblo, CO (US); Weiming Lu, Akron, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 309 days.

(21) Appl. No.: 15/352,165

(22) Filed: Nov. 15, 2016

(65) Prior Publication Data

US 2018/0134628 A1 May 17, 2018

(51) Int. Cl.

| C04B 35/83 | (2006.01) |
|---|---|
| C04B 35/622 | (2006.01) |
| C04B 35/628 | (2006.01) |
| C04B 35/64 | (2006.01) |
| B29K 33/20 | (2006.01) |

(52) U.S. Cl.
CPC ........ *C04B 35/83* (2013.01); *C04B 35/62272* (2013.01); *C04B 35/62849* (2013.01); *C04B 35/62878* (2013.01); *C04B 35/64* (2013.01); *B29K 2033/20* (2013.01); *C04B 2235/422* (2013.01); *C04B 2235/5232* (2013.01); *C04B 2235/5248* (2013.01); *C04B 2235/614* (2013.01)

(58) Field of Classification Search
CPC ... C04B 35/83; C04B 35/62878; C04B 35/64; C04B 35/62272; C04B 35/62849; C04B 2235/523; C04B 2235/5248
See application file for complete search history.

(56) References Cited

U.S. PATENT DOCUMENTS

| 4,376,803 A | 3/1983 | Katzman |
|---|---|---|
| 5,208,099 A | 5/1993 | Maiwald-Hiller et al. |
| 5,380,556 A | 1/1995 | Hocquellet |
| 5,562,966 A | 10/1996 | Clarke |
| 6,514,592 B1 | 2/2003 | Hubbard et al. |
| 6,668,984 B2 | 12/2003 | Gray |
| 2007/0007678 A1* | 1/2007 | Benitsch ............... C04B 35/573 264/29.1 |
| 2008/0090064 A1* | 4/2008 | James .................. C04B 35/573 428/292.1 |
| 2014/0255635 A1* | 9/2014 | Morgan .................. C08K 3/36 428/36.1 |

(Continued)

OTHER PUBLICATIONS

European Patent Office, European Search Report dated Apr. 6, 2018 in Application No. 17201831.9-1101.

(Continued)

*Primary Examiner* — Joseph S Del Sole
*Assistant Examiner* — Mohamed K Ahmed Ali
(74) *Attorney, Agent, or Firm* — Snell & Wilmer L.L.P.

(57) ABSTRACT

The method may include forming fibers with a silicon-based sizing, forming a fibrous preform from the fibers, forming a silicon dioxide coating around the fibers, carbonizing the fibrous preform, and densifying the fibrous preform. In various embodiments, forming the fibers with the silicon-based sizing includes utilizing a mass of the silicon-based sizing that is at least 1.0% of a mass of the fibers.

20 Claims, 2 Drawing Sheets

(56) References Cited

U.S. PATENT DOCUMENTS

2015/0376064 A1* 12/2015 Chung .................. C04B 33/326
                                                                                        501/100
2016/0265143 A1    9/2016  Garnier

OTHER PUBLICATIONS

Jawed I et al: "Oxidation protection in carbon-carbon composites", Materials Research Bulletin, Elsevier, Kid Li Ng Ton, GB, vol. 21, No. 11, Nov. 1, 1986 (Nov. 1, 1986), pp. 1391-1395.

* cited by examiner

OXIDATION PROTECTION FOR CARBON-CARBON COMPOSITES

FIELD

The present disclosure relates generally to carbon-carbon composites and, more specifically, to oxidation protection systems for carbon-carbon composite structures.

BACKGROUND

Oxidation protection systems for carbon-carbon composites are typically designed to minimize loss of carbon material due to oxidation at operating conditions. Phosphate-based oxidation protection systems may reduce infiltration of oxygen and oxidation catalysts into the composite structure. However, despite the use of such oxidation protection systems, oxidation of the carbon-carbon composites may still occur during operation of components such as, for example, components of an aircraft braking system.

SUMMARY

Disclosed herein, according to various embodiments, is a method of manufacturing a carbon-carbon composite material. The method may include forming fibers with a silicon-based sizing, forming a fibrous preform from the fibers, forming a silicon dioxide coating around the fibers, carbonizing the fibrous preform, and densifying the fibrous preform.

In various embodiments, forming the fibers with the silicon-based sizing includes utilizing a mass of the silicon-based sizing that is at least 1.0% of a mass of the fibers. In various embodiments, forming the fibers with the silicon-based sizing includes utilizing a mass of the silicon-based sizing that is between about 1.0% and about 10% of a mass of the fibers. In various embodiments, forming the fibers with the silicon-based sizing includes utilizing a mass of the silicon-based sizing that is between about 1.0% and about 5.0% of a mass of the fibers. In various embodiments, forming the fibers with the silicon-based sizing includes utilizing a mass of the silicon-based sizing that is between about 1.0% and about 4.0% of a mass of the fibers. In various embodiments, forming the fibers with the silicon-based sizing includes utilizing a mass of the silicon-based sizing that is between about 1.0% and about 3.5% of a mass of the fibers.

In various embodiments, the method further includes applying an external oxidation protection coating after densifying the fibrous preform. In various embodiments, forming the silicon dioxide coating around the fibers occurs during carbonizing the fibrous preform. In such embodiments, carbonizing the fibrous preform is performed with oxygen present. In such embodiments, forming the silicon dioxide coating around the fibers also occurs during densifying the fibrous preform.

In various embodiments, forming the silicon dioxide coating around the fibers occurs during densifying the fibrous preform. In various embodiments, forming the silicon dioxide coating around the fibers occurs after carbonizing the fibrous preform. Forming the fibers with the silicon-based sizing may include using oxidized polyacrylonitrile fibers. In various embodiments, forming the silicon dioxide coating around the fibers includes encompassing the carbon fibers at a fiber-matrix interface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
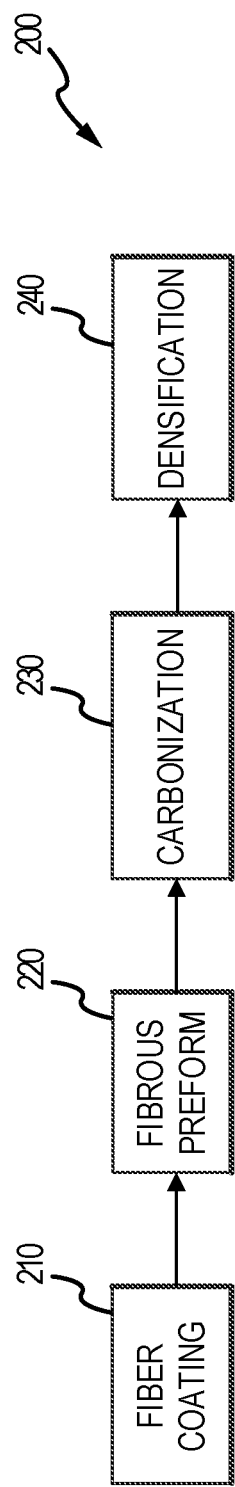
FIG. 1 illustrates a flow chart of a carbon/carbon (carbon-carbon) composite structure manufacturing process, in accordance with various embodiments.

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Carbon-carbon composites (also referred to herein as composite structures, composite substrates, and carbon-carbon composite structures, interchangeably) in the form of friction disks are commonly used for aircraft brake disks and race car brake and clutch disks. Carbon-carbon brake disks are especially useful in these applications because of the superior high temperature characteristics of carbon-carbon material. In particular, the carbon-carbon material used in carbon-carbon parts is a good conductor of heat and is able to dissipate heat generated during braking away from the braking surfaces. Carbon-carbon material is also highly resistant to heat damage, and thus, is capable of sustaining friction between brake surfaces during severe braking without a significant reduction in the friction coefficient or mechanical failure. Carbon-carbon composites in the form of friction disks may operate as a heat sink to absorb large amounts of kinetic energy converted to heat during slowing of the aircraft. Carbon-carbon composites may be utilized in other high-temperature conditions.

In various embodiments and under certain operating conditions, carbon-carbon composites may be prone to material loss from oxidation of the carbon. For example, various carbon-carbon composite components of an aircraft wheel braking assembly may experience both catalytic oxidation and inherent thermal oxidation caused by heating the composite during operation. In various embodiments, composite rotors and stators may be heated to sufficiently high temperatures that may oxidize the carbon surfaces exposed to air. At elevated temperatures, infiltration of air and contaminants may cause internal oxidation and weakening, especially in and around brake rotor lugs or stator slots securing the friction disks to a respective torque bar and torque take-out assembly.

Because carbon-carbon composite components of aircraft wheel braking assembly may retain heat for a substantial time period after slowing the aircraft, oxygen from the ambient atmosphere may react with the carbon matrix and/or carbon fibers to accelerate material loss. Further, damage to carbon-carbon composite components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures of about 900° C. (1652° F.) or higher. However, it will be recognized that the oxidation protection systems and methods of the present disclosure may be readily adapted to many carbon-carbon composite structures susceptible to oxidation losses from infiltration of atmospheric oxygen and/or catalytic contaminants.

In various embodiments, an external oxidation protection system may be utilized to protect and prevent a formed carbon-carbon composite structure from undergoing extensive carbon oxidation. The external oxidation protection system may involve a method that includes applying an oxidation protection layer/coating on a carbon-carbon composite structure. In various embodiments, the external oxidation protection system may include applying silicon carbide, boron carbide, and/or phosphate-based coating materials, among others, to a carbon-carbon composite structure.

In various embodiments, carbon oxidation of a carbon-carbon composite material may be inhibited by implementing an internal carbon oxidation protection method. The internal carbon oxidation protection method may include forming a silicon dioxide ("$SiO_2$") around carbon fibers during one or more steps of a carbon-carbon composite manufacturing method. In various embodiments, the internal carbon oxidation protection method may include forming the $SiO_2$ coating around carbon fibers after the other steps of the carbon-carbon composite manufacturing method are complete.

With reference to FIG. 1 and according to various embodiments, a general method 200 of manufacturing carbon-carbon composites is disclosed herein. In accordance with various embodiments, a carbon-carbon composite structure may be produced by using a fiber coating process (step 210), forming the oxidized PAN fiber preform (step 220), carbonization (step 230), and densification (step 240). In various embodiments, the carbon fiber coating process (step 210) may be performed before forming the oxidized PAN fiber preform (step 220), after forming the oxidized PAN fiber preform (step 220) and before carbonization (step 230), or after carbonization (step 230) and before densification (step 240). Thus, the order of the steps of the method is not limited to the depicted order shown in the flow chart of FIG. 1.

In various embodiments, the method for manufacturing carbon-carbon materials includes fabrication of an oxidized PAN or carbon fiber preform, followed by carbonization and chemical vapor infiltration (CVI) densification. The chemical vapor infiltration cycles are continued, in conjunction with machining the preform between infiltration cycles if desired, until the desired part density is achieved.

An array of carbon fibers, such as a sheet of carbon fibers for example, is coated to prevent oxidation of the carbon-carbon composite structure. A fibrous preform is made utilizing a variety of textile manufacturing techniques. Typically, in manufacturing aircraft brake materials, the fibrous preform is made from oxidized polyacrylonitrile (PAN) fiber ("OPF"). After the fibrous preform is made, it is carbonized to convert the OPF into carbon fibers. Typically, fibrous preforms are carbonized by placing the preforms in a furnace with an inert atmosphere. The heat of the furnace causes a chemical conversion which drives off the non-carbon chemical species from the preform. The resulting preform generally has the same fibrous structure as the fibrous preform before carbonizing. However, the OPF have been converted preferably to almost 100% carbon. After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a pyrolytic carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting carbon-carbon part has a carbon fiber structure with a carbon matrix infiltrating the fiber structure, thereby deriving the name "carbon-carbon."

Figure 2:
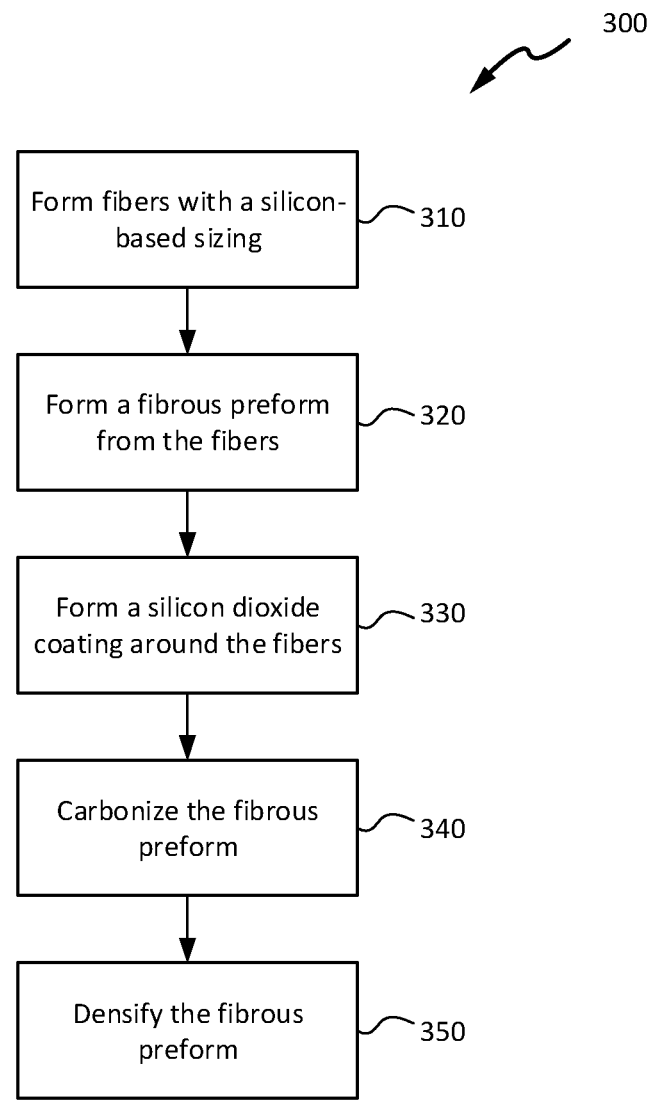
FIG. 2 illustrates a method for manufacturing a carbon-carbon composite that includes forming a silicon dioxide coating around carbon fibers, in accordance with various embodiments.

With reference to FIG. 2, and according to various embodiments, a method 300 is disclosed, for manufacturing a carbon-carbon composite, that includes the application of the above-discussed internal oxidation protection system. The method 300, according to various embodiments, includes forming fibers with a silicon-based sizing at step 310, forming a fibrous preform from the fibers at step 320, forming a silicon dioxide coating around the fibers at step 330, carbonizing the fibrous preform at step 340, and densifying the fibrous preform at step 350.

In various embodiments, carbonizing the fibrous preform at step 340 may include similar processes and features as those described above with reference to the carbonization step 230 shown in FIG. 1. Similarly, densifying the fibrous preform at step 350 may include similar processes and features as those described above with reference to the densification step 240 shown in FIG. 1.

In various embodiments, step 310 includes utilizing a silicon-based sizing applied to the fibers. "Sizings," as used herein, are chemical compositions that are utilized to protect the carbon fibers from physical damage during manufacturing. The silicon-based sizing includes at least one of elemental silicon and one or more silicon compounds. In various embodiments, the silicon-based sizing includes various other constituents that are configured to improve the ease of working with the fibers. For example, the silicon-based sizing may, in addition to the carbon protecting features described below, facilitate the prevention of residue build-up on the fibers and/or the processing equipment. Further, the silicon-based sizing may impact (e.g., decrease, or at least not increase) friction between fibers.

In various embodiments, step 310 of the method 300 includes utilizing the silicon-based sizing level of at least 1.0%. The "sizing level," as referred to herein, refers to the amount (e.g., mass) of silicon-based sizing used relative to the mass of the fibers. Thus, a 1% sizing level would mean that the mass of silicon applied to the fibers is equal to 1% of the mass of the fibers. In various embodiments, the silicon-based sizing level utilized in step 310 is between about 1.0% and about 10%. In various embodiments, the silicon-based sizing level utilized in step 310 is between about 1.0% and about 5.0%. In various embodiments, the silicon-based sizing level utilized in step 310 is between about 1.0% and about 4.0%. In various embodiments, the silicon-based sizing level utilized in step 310 is between about 1.0% and about 3.5%. In various embodiments, the silicon-based sizing level utilized in step 310 is between about 1.5% and about 5.0%. In various embodiments, the silicon-based sizing level utilized in step 310 is between about 1.5% and about 3.0%. As used in this context only, the term "about" means plus or minus 0.25%.

The utilization of a silicon-based sizing at such above described levels, according to various embodiments, enables silicon dioxide to form around the fibers in step 330. That is, silicon from the silicon-based sizing applied over the carbon fibers during step 310 is the precursor to the silicon dioxide coating that forms in step 330, according to various embodiments. In various embodiments, other oxide compounds (e.g., other than silicon dioxide) may be formed during this step. Thus, the coating formed at step 330 is not necessarily limited to silicon dioxide. Forming the silicon dioxide coating around the carbon fibers at step 330 may include heating the carbon fibers in the presence of oxygen. As described below, step 330 may occurring during (e.g., simultaneously) or after various steps of the method 300. Thus, while step 330 is shown in a particular order in FIG. 3 relative to the other steps of the method 300, step 330 may occur, as described in greater detail below, before, during, or after various steps of the method 300. Accordingly, the ordering of the steps of the method 300 are not limited to the as-depicted ordering shown in FIG. 2.

In various embodiments, forming the silicon dioxide coating around the carbon fibers (step 330) occurs during carbonizing the fibrous preform (step 340). Accordingly, carbonizing the fibrous preform may be performed with oxygen present (e.g., allowing an amount of oxygen to enter the atmosphere in which the carbonization process is performed). In various embodiments, forming the silicon dioxide coating around the fibers (step 330), in addition to occurring during step 340, also continues to occur during densifying the fibrous preform (step 350). In various embodiments, forming the silicon dioxide coating around the fibers (step 330) may only occur during densifying the fibrous preform (step 350). In various embodiments, forming the silicon dioxide coating around the fibers (step 330) at least may occur after carbonizing the fibrous preform (step 340) (e.g. and before step 350).

In various embodiments, the method 300 may further include, in addition to the step (330) of forming the silicon dioxide coating around the fibers, applying an external oxidation protection coating to the formed carbon-carbon composite after densifying the fibrous preform at step 350. That is, the method 300 may include both the internal coating of fibers with the silicon layer formed during step 330 (e.g., and from the application of the silicon-based sizing during step 310) and the external oxidation protection system applied, for example, after densifying the fibrous preform at step 350 (e.g., after final machining).

In various embodiments, step 310 of forming the fibers with the silicon-based sizing includes forming oxidized polyacrylonitrile fibers. In various embodiments, forming the silicon dioxide coating around the carbon fibers (step 330) includes encompassing the carbon fibers at a fiber-matrix interface.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a carbon-carbon composite material, the method comprising:
   forming fibers with a silicon-based sizing, wherein forming the fibers with the silicon-based sizing comprises applying at least one of elemental silicon and silicon compounds over the fibers;
   forming a fibrous preform from the fibers;
   forming a silicon dioxide coating around the fibers, wherein the silicon dioxide coating is formed from the at least one of elemental silicon and silicon compounds applied over the fibers;
   carbonizing the fibrous preform; and
   densifying the fibrous preform;
   wherein forming the fibers with the silicon-based sizing is performed before forming the silicon dioxide coating around the fibers, before carbonizing the fibrous preform, and before densifying the fibrous preform.

2. The method of claim 1, wherein forming the fibers with the silicon-based sizing comprises utilizing a mass of the silicon-based sizing that is at least 1.0% of a mass of the fibers.

3. The method of claim 1, wherein forming the fibers with the silicon-based sizing comprises utilizing a mass of the silicon-based sizing that is between about 1.0% and about 10% of a mass of the fibers.

4. The method of claim 1, wherein forming the fibers with the silicon-based sizing comprises utilizing a mass of the silicon-based sizing that is between about 1.0% and about 5.0% of a mass of the fibers.

5. The method of claim 1, wherein forming the fibers with the silicon-based sizing comprises utilizing a mass of the silicon-based sizing that is between about 1.0% and about 4.0% of a mass of the fibers.

6. The method of claim 1, wherein forming the fibers with the silicon-based sizing comprises utilizing a mass of the silicon-based sizing that is between about 1.0% and about 3.5% of a mass of the fibers.

7. The method of claim 1, further comprising applying an external oxidation protection coating after densifying the fibrous preform.

8. The method of claim 1, wherein forming the silicon dioxide coating around the fibers occurs during carbonizing the fibrous preform.

9. The method of claim 8, wherein carbonizing the fibrous preform is performed with oxygen present.

10. The method of claim 8, wherein forming the silicon dioxide coating around the fibers occurs during densifying the fibrous preform.

11. The method of claim 1, wherein forming the silicon dioxide coating around the fibers occurs during densifying the fibrous preform.

12. The method of claim 1, wherein forming the silicon dioxide coating around the fibers occurs after carbonizing the fibrous preform.

13. The method of claim 1, wherein forming the fibers with the silicon-based sizing comprises using oxidized polyacrylonitrile fibers.

14. The method of claim 1, wherein forming the silicon dioxide coating around the fibers comprises encompassing the carbon fibers at a fiber-matrix interface.

15. A method of manufacturing a carbon-carbon composite material, the method comprising:
    forming oxidized polyacrylonitrile fibers ("OPF") with a silicon-based sizing, wherein a mass of the silicon-based sizing is between about 1.5% and about 5.0% of a mass of the OPF, wherein forming the OPF with the silicon-based sizing comprises applying at least one of elemental silicon and silicon compounds over the OPF;
    forming a fibrous preform from the OPF;
    forming a silicon dioxide coating around the OPF;
    carbonizing the fibrous preform; and
    densifying the fibrous preform;
    wherein forming the OPF with the silicon-based sizing is performed before forming the silicon dioxide coating around the OPF, before carbonizing the fibrous preform, and before densifying the fibrous preform.

16. The method of claim 15, wherein the mass of the silicon-based sizing is between about 2.0% and about 4.0% of the mass of the OPF.

17. The method of claim 15, further comprising applying an external oxidation protection coating after densifying the fibrous preform.

18. The method of claim 15, wherein forming the silicon dioxide coating around the OPF occurs during carbonizing the fibrous preform.

19. The method of claim 18, wherein carbonizing the fibrous preform is performed with oxygen present.

20. A method of manufacturing a carbon-carbon composite material, the method comprising:
    forming oxidized polyacrylonitrile fibers ("OPF") with a silicon-based sizing, wherein a mass of the silicon-based sizing is between about 2.0% and about 4.0% of a mass of the OPF, wherein forming the OPF with the silicon-based sizing comprises applying at least one of elemental silicon and silicon compounds over the OPF;
    forming a fibrous preform from the OPF;
    carbonizing the fibrous preform;
    during carbonizing the fibrous preform, forming a silicon dioxide coating around the OPF; and
    densifying the fibrous preform;
    wherein forming the OPF with the silicon-based sizing is performed before carbonizing the fibrous preform, before forming the silicon dioxide coating around the OPF, and before densifying the fibrous preform.

* * * * *